US006964329B1

United States Patent
DiBianca et al.

(10) Patent No.: US 6,964,329 B1
(45) Date of Patent: Nov. 15, 2005

(54) STEP DOWN PRODUCT ACCUMULATION SYSTEM

(75) Inventors: Vincent DiBianca, Pine Hill, NJ (US); William J. Chatterton, Waterford Works, NJ (US); Gregory M. Rueblinger, Somerdale, NJ (US)

(73) Assignee: Garvey Corporation, Blue Anchor, NJ (US)

( * ) Notice: Subject to any disclaimer, the term of this patent is extended or adjusted under 35 U.S.C. 154(b) by 3 days.

(21) Appl. No.: 10/877,705

(22) Filed: Jun. 25, 2004

(51) Int. Cl.[7] .............................................. B65G 47/12
(52) U.S. Cl. ................................... 198/443; 198/347.1
(58) Field of Search ........................... 198/443, 347.1, 198/347.2, 347.4

(56) References Cited

U.S. PATENT DOCUMENTS

| | | | | |
|---|---|---|---|---|
| 5,372,236 A | * | 12/1994 | Layer | 198/392 |
| 6,374,985 B1 | * | 4/2002 | Nakashima et al. | 198/391 |
| 6,575,287 B2 | * | 6/2003 | Garvey et al. | 198/418.6 |
| 6,612,417 B2 | * | 9/2003 | Garvey | 198/443 |
| 6,612,425 B1 | * | 9/2003 | Garvey | 198/839 |

* cited by examiner

Primary Examiner—Richard Ridley
(74) Attorney, Agent, or Firm—Stuart M. Goldstein

(57) ABSTRACT

A step down product conveying and accumulation system employs one or more conveyors with a product path section, on which products are conveyed, and an accumulator section, for accumulation of products for recirculation and eventual delivery to a downstream destination. A length of the product path section is located within a first transverse plane. The accumulator section is located within a second transverse plane, in spaced apart relation with the product path section. A transfer surface in the form of a slide plate, air slide plenum system, or other low resistance or frictionless surface is employed as the transfer medium. Rather than transporting products, which are not properly aligned or which are unstable, for immediate delivery downstream, or for accumulation such that they reach the turbulence point which may cause system disruption, such products are transferred for accumulation by traveling smoothly and efficiently from the product path section downwardly on the transfer surface, onto the accumulator section. From there, the products are recirculated and properly aligned for ultimate, unencumbered downstream delivery.

30 Claims, 4 Drawing Sheets

STEP DOWN PRODUCT ACCUMULATION SYSTEM

BACKGROUND OF THE INVENTION

Product accumulation systems are routinely used in conjunction with conveyors for the storage and accumulation of products which are fed from an upstream source onto conveyors. In the normal operation of this type system, products are placed on a conveyor at the upstream location, for instance at one operational station, and then transported to a downstream location by conveyor where the next step in the manufacture or distribution of the products is to be accomplished.

It is not uncommon that, during this process, there may be a disruption at a downstream location caused by a malfunction of machinery, some constraining problem like fallen or misaligned products, or other circumstance which prevents the downstream facility from accepting products. Continued operation of production upstream may result in the build-up of line back-pressure which could cause a further problem in permitting the unrestricted movement of products. However, if such a disruption is one which can be addressed relatively quickly, upstream products which normally would be transported to the malfunctioning location, can be received and temporarily stored by an accumulator which is integral to the system.

By employing such an accumulator, the upstream machinery can continue to operate by moving products to the accumulator. Since product movement can continue, there is no build-up of line pressure. Such a system also saves the substantial time and expense which would result in having to shutdown and then restart the entire system, if no accumulator was otherwise available.

As products are being received and retained by the accumulator, the downstream problem can be addressed. When that part of the system resumes full operation, the products stored in the accumulator are released to the downstream destination, with little downtime to the system. Products can also be received and stored at the accumulator in case there is an upstream disruption. In this case, accumulated products could be retained and sent downstream in order to keep the system operational while the upstream problem is being remedied.

The limitations and disadvantages of prior accumulator systems have been substantially overcome by the systems in U.S. Pat. Nos. 6,575,287 and 6,612,425. These systems disclose continuous single path conveyors, uniquely configured to transport products and comprising accumulator sections to accommodate and handle excessive product loads. However, these systems, as effective as they are, do not address special problems inherent in certain products or containers with particular shapes, sizes, configurations, or weights which make their movement and downstream feed more difficult. The specialized characteristics of such products containers may result in there being displaced or misaligned during the conveying process. This often results in the misfeeding of the product downstream or a build-up of line back-pressure due to fallen containers, with a subsequent disruption in the system. For example, relatively small packaged products often must be fed single file, from the conveyor system to the downstream destination. Such products must be properly aligned as they leave the conveyor system. If one or more of the products are askew, product feed to the downstream discharge may be blocked, causing a build-up of line back-pressure. A similar problem results from the movement, for example, of empty plastic bottle containers which, if not properly aligned for downstream discharge, may tip over, due to their high centers of gravity, again causing a disruption in the system.

In both these and other cases, there must be a free flow and proper alignment of products as the products are accumulated and then recirculated. If this free flow is interrupted, the accumulation process will be compromised and the products will reach the "turbulence point": that is the area in which accumulation of products will result in falling or misaligned products, blockage of the system, and build-up of line back pressure, causing a virtual stoppage of product movement. It is important that the system does not permit the products from reaching this turbulence point.

Prior conveyor systems have been developed to address this and similar problems. One such system uses an actual step or drop-off between an accumulator and conveyor or between conveyors, in which products physically drop down or are caused to fall from one conveying surface to another. This has the obvious disadvantage of products becoming misaligned or actually falling over. Of course such a result leads to further disruptions of the system's operation.

SUMMARY OF THE INVENTION

It is thus the object of the present invention to provide additional flexibility and alternatives for product conveying and accumulation systems by means of a uniquely configured transfer component for such systems which prevents products from reaching the turbulence point.

It is an object of the present invention to provide a step down product accumulation system which prevents products from reaching the turbulence point, thus preventing system disruption problems.

It is a further object of the present invention to provide a step down product accumulation system which relieves the potential line back-pressure caused by misplaced, accumulated products.

It is still another object of the present invention to provide a step down product accumulation system which ensures for effective accumulation and eventual product alignment for downstream delivery.

It is another object of the present invention to provide a step down product accumulation system which uses a transfer surface between product transporting and product accumulator sections to permit products which may not be properly aligned for conveyance downstream, to smoothly and efficiently travel to the accumulator section, where they can be stabilized, recirculated and aligned and for proper downstream delivery.

It is a further object of the present invention to provide a step down product accumulation system which can be used in conjunction with systems using either single, continuous loop path conveyor systems or dual, continuous loop path conveyors systems.

It is still another object of the present invention to provide a step down product accumulation system which employs a slide plate with a low resistance or substantially frictionless surface as the transfer medium between the product transporting and the product accumulator sections of the system.

It is another object of the present invention to provide a step down product accumulation system which employs an air slide system with a low resistance or substantially frictionless surface as the transfer medium between the product transporting and the product accumulation sections of the system.

It is still a further object of the present invention to provide a step down product accumulation system which allows its transfer medium to be angularly adjustable, depending on the type of product or container being transported.

These and other objects are accomplished by the present invention which consists of a step down product conveying and accumulation system which employs one or more conveyors with a product path section, on which products are conveyed, and an accumulator section, for accumulation of products for recirculation and eventual delivery to a downstream destination. A length of the product path section is located within a first transverse plane. The accumulator section is located within a second transverse plane, in spaced apart relation with the product path section. A transfer surface in the form of a slide plate, air slide plenum system, or other low resistance or frictionless surface is employed as the transfer medium. Rather than transporting products, which are not properly aligned or which are unstable, for immediate delivery downstream, or for accumulation such that they reach the turbulence point which may cause system disruption, such products are transferred for accumulation by traveling smoothly and efficiently from the product path section downwardly on the transfer surface, onto the accumulator section. From there, the products are recirculated and properly aligned for ultimate, unencumbered downstream delivery.

Novel features which are considered as characteristic of the invention are set forth in particular in the dependent claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
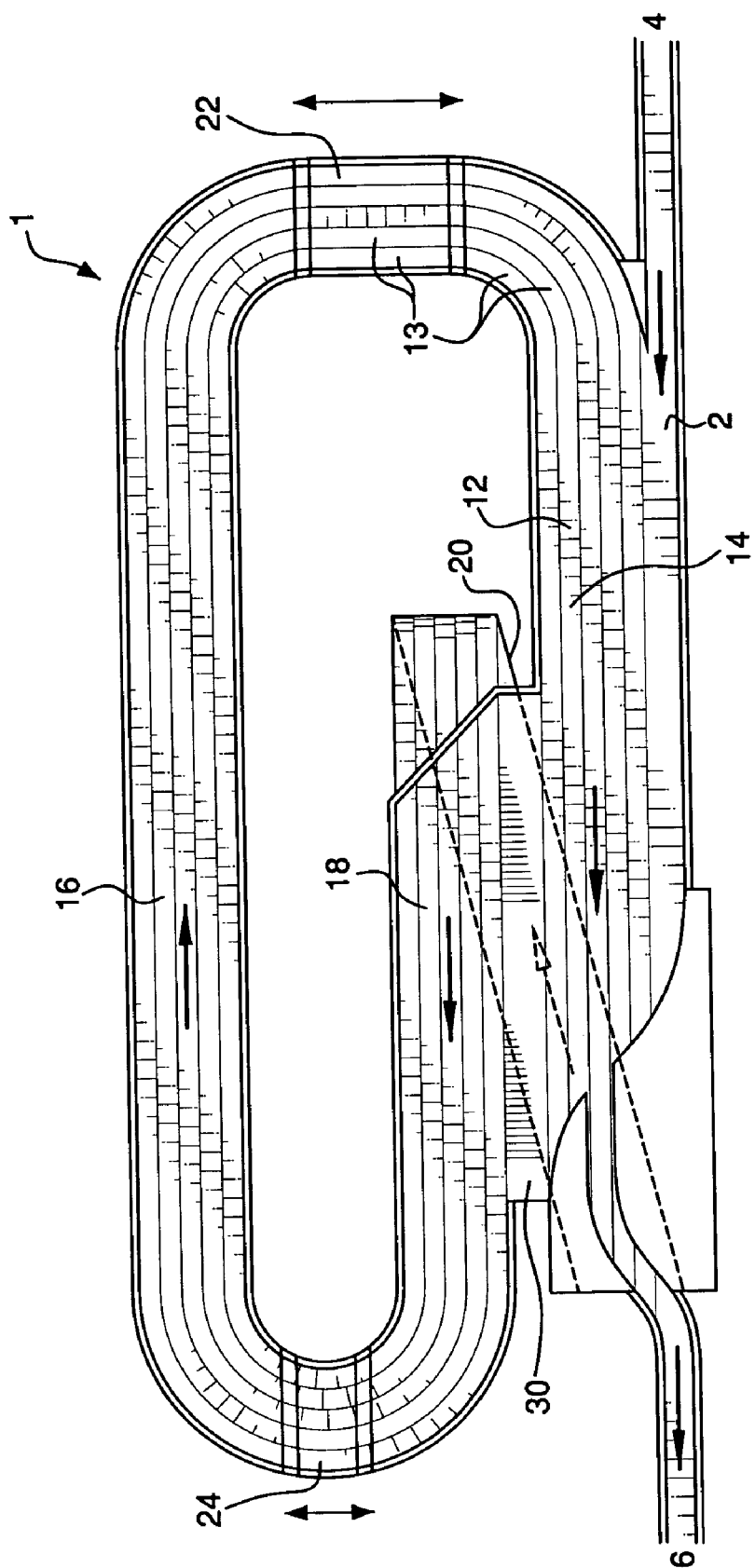
FIG. 1 is a top view of a product conveying and accumulation system showing the transfer surface of the present invention employed with a single conveyor system.

The product conveying system and accumulation system 1 of the present invention, shown in FIG. 1, comprises conveyor 2 which is configured to move product from an upstream location or station designated as 4, to a downstream location or station designated as 6.

System 1 also consists of a conveyor 12 which may be constructed of interlocked segments 13 which are well known in the industry. Conveyor 12 comprises product path sections 14 and 16 and accumulator section 18. All of these sections make up a single, continuous looped path conveyor which is completed by section 20 of conveyor 12. Section 20 is positioned underneath and wraps down and up to accumulator section 18. The direction of travel of conveyors 2 and 12 are depicted by the directional arrows shown in FIG. 1.

Figure 2:
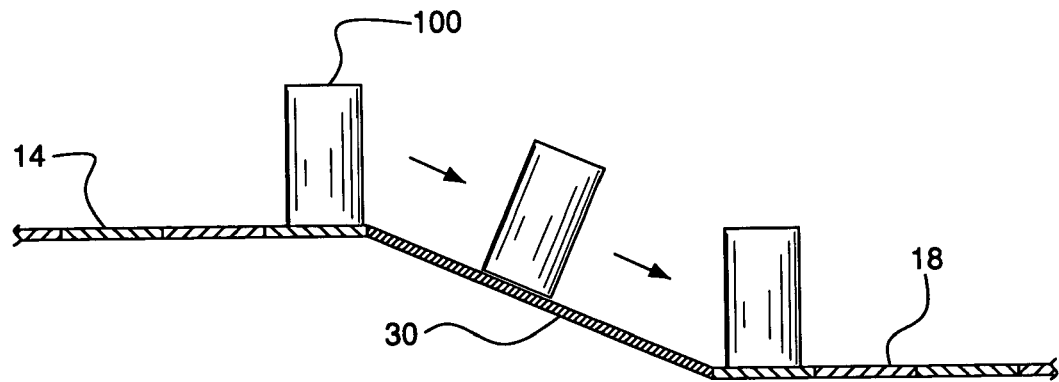
FIG. 2 is a side view of the transfer surface of the present invention in use.
Figure 3:
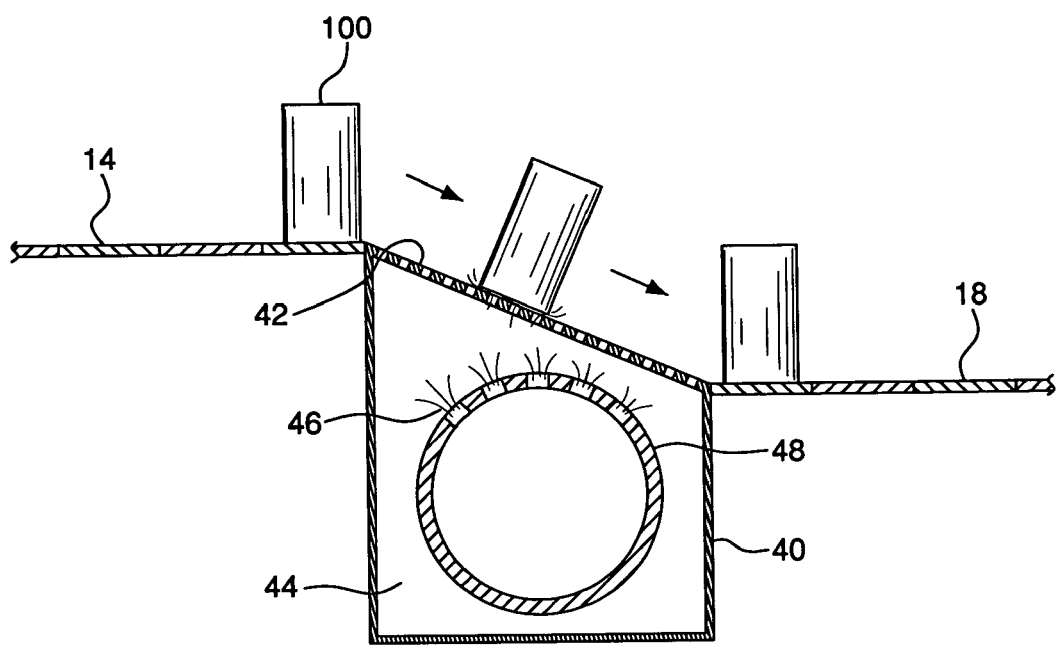
FIG. 3 is a side view of the alternate medium as the transfer surface of the present invention in use.

As seen in FIGS. 1 and 2, product path section 14 is located within a higher, yet parallel transverse plane than the transverse plane within which accumulator section 18 is located. Located between and interconnecting product path section 14 and accumulator section 18 is a slide transfer medium, transfer surface 30, extending at a downward angle from product path section 14 to accumulator section 18. It is contemplated that transfer surface 30 comprises a solid, smooth, low resistant slide plate made of stainless steel or like material. Alternatively, the transfer medium could comprise air slide system 40, as shown in FIG. 3. Air slide system 40 comprises surface 42 covering an air plenum chamber 44 through which high volume, moderate pressure air 46 is discharged through hose 48. Surface 42 can be made of Dynapore™ screen or similar air permeable material. The object is to create a low resistant, substantially frictionless surface as the transfer medium for surface 42.

Whatever transfer medium is used, products 100, moving along product path section 14, will be permitted to slide smoothly downward onto accumulator section 18, without reaching the turbulence point which often occurs with products which are being accumulated. Transfer surfaces 30 and 42 also provide products which are not properly aligned for downstream delivery, to slide down to accumulator section 18, where they can be properly realigned during recirculation around the system.

It is anticipated that the angle between transfer surface 30 or 42 and product path section 14 and accumulator section 18 can be varied, depending on the type of product being conveyed and delivered on system 1. For instance, a relatively shallow decline, in relation with the horizontal, may be best for the transfer of plastic bottles with a high centers of gravity. A steeper angle of decline may be appropriate for more stable containers such as canned goods or items with low centers of gravity. In any event, this invention is not deemed to be restricted by the angle of the transfer surface, since the invention contemplates use of transfer surfaces at a variety of different angles, again depending on product configuration, size, weight, movement, and other factors.

In fact, as shown in FIG. 1, provision can be made to adjustably vary the angle of the conveyor system's transfer surface. For example, interlocking segments 13 of sections 22 and 24 of conveyor 12 can be expandably adjusted, as is well-known in the art, to lengthen conveyor 12. This will allow product path section 16 and accumulator section 18 to be moved outward, which will result in a shallower angle of decent angle of transfer surface 30 in relation with the horizontal. For this adjustable feature, transfer surfaces 30 and 42 must be hinged or otherwise pivotably mounted to product path section 14 and/or accumulator section 18. Providing such an expandable conveyor system increases the flexibility and versatility of the system.

Figure 4:
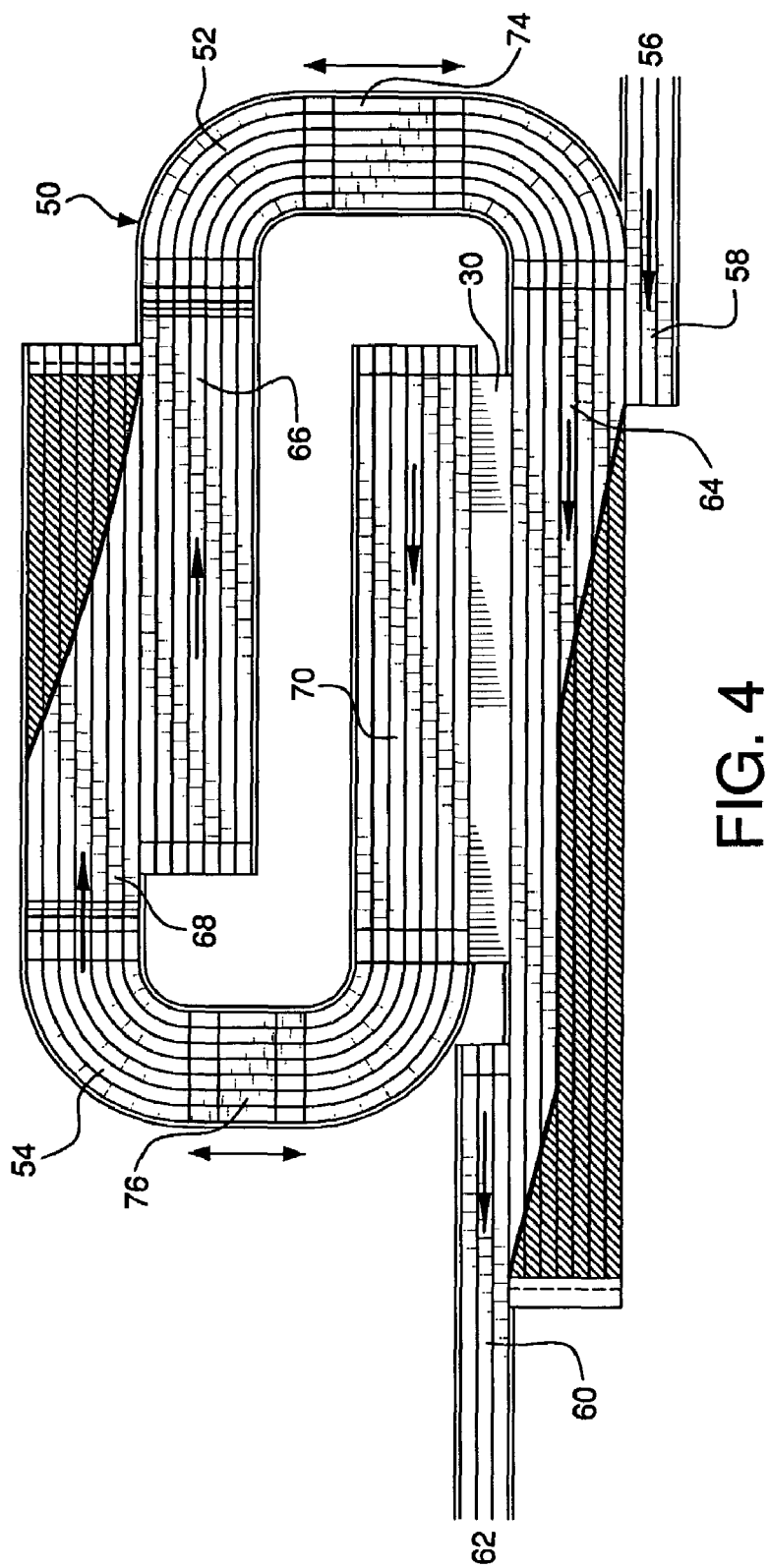
FIG. 4 is a top view of a product conveying and accumulation system showing the transfer surface of the present invention employed with a dual conveyor system.

FIG. 4 shows alternate product conveying and accumulation system 50, which can be used with the present invention. System 50 comprises two U-shaped conveyors 52 and 54 which are configured to assist in the movement of products from an upstream location or station designated at 56, via conveyor 58. Conveyor 60 is configured to delivery products from system 50 to a downstream location designated as 62. Conveyor 52 comprises product path section 64 and accumulator section 66 and conveyor 54 comprises product path section 68 and accumulator section 70. Product path section 64 is located parallel to and within a higher transverse plane than accumulator section 70 and the two sections are in space apart relation with each other. Product path section 68 and accumulator section 66 are parallel to each other and adjacently aligned in the same transverse plane. Once again, directional arrows denote the direction of movement of conveyors 52, 54, 58 and 60.

Transfer surface 30, described previously, interconnects product path section 64 of conveyor 52 with accumulator section 70 of conveyor 54. Just as with the embodiment disclosed and previously described with regard to FIG. 1, the transfer surface can be a solid plate, an air slide system or equivalent slide transfer medium.

Figure 5:
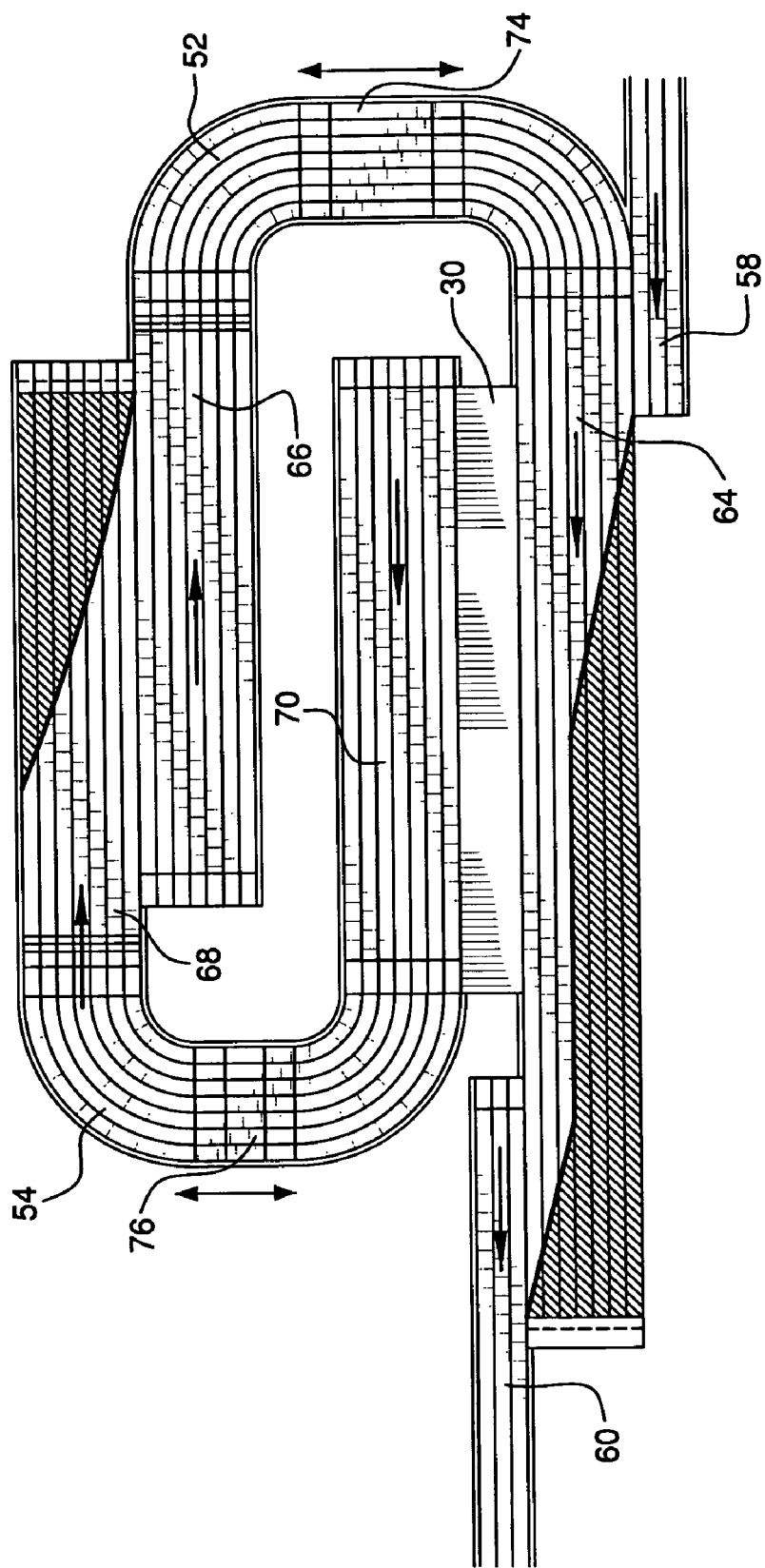
FIG. 5 is a top view of the product conveying and accumulation system shown in FIG. 2, adjusted to a different position.

Also as discussed with regard to the prior embodiment, sections 74 of conveyor 52 and 76 of conveyor 54 can be adjustably expanded allowing product path sections 68 and adjacent accumulator section 66 to move outward, as shown in FIG. 5; thus decreasing the angle of decent of transfer surface 30 in relation to the horizontal.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed is:

1. A product conveying and accumulation system, said system comprising:

first conveying means for the movement of products from an upstream destination to a destination downstream of the system;

second conveying means for receiving products from the first conveying means, for accumulation and movement of products on and around the second conveying means and for movement and delivery of products to the downstream destination, said second conveying means comprising a product path section moving in a forward direction of travel, said product path section located within a first transverse plane and an accumulator section located within a second transverse plane, in spaced apart relation with the product path section; and transfer means positioned between the product path section and the accumulator section for downward movement of products from the product path section onto the accumulator section, said transfer means comprising a single, planar transfer surface with two longitudinally extending edges, one edge directly adjacent to the product path section and the second edge directly adjacent to the accumulator section, whereby products moving along the product path section are caused to slide down from the product path section directly onto the transfer surface as a direct result of the movement of the product path section in said direction of travel and the relative positions of and interaction between the products as they move along the second conveying means, and not as a result of products encountering an intervening surface.

2. The product conveying and accumulation system as in claim 1 wherein the transfer means is positioned at a given angle between the product path section and the accumulator section.

3. The product conveying and accumulation system as in claim 1 wherein the angle between the transfer means and the product path section and the accumulator section is adjustable for changing the transverse planes within which the second conveyor means are located.

4. The product conveying and accumulation system as in claim 1 wherein the transfer means directs product downwardly between the product path section and the accumulator section.

5. The product conveying and accumulation system as in claim 1 wherein the transfer surface comprises a substantially frictionless outer surface which allows for smooth downward movement of products between the product path section and the accumulator section.

6. The product conveying and accumulation system as in claim 1 wherein the transfer surface comprises an outer surface which allows for smooth downward movement of products between the product path section and the accumulator section.

7. The product conveying and accumulation system as in claim 1 wherein the transfer surface comprises a transfer slide plate which allows for smooth downward movement of products between the product path section and the accumulator section.

8. The product conveying and accumulation system as in claim 1 wherein the transfer surface comprises an air slide system which allows for smooth downward movement of products between the product path section and the accumulator section.

9. The product conveying and accumulation system as in claim 1 wherein the transfer means permits products to slide downwardly from the product path section to the accumulator section for recirculation to the downstream destination.

10. The product conveying and accumulation system as in claim 1 wherein the second conveying means comprises a single, continuous loop path conveyor.

11. The product conveying and accumulation system as in claim 1 wherein the second conveying means comprises first and second continuous loop path conveyors.

12. The product conveying and accumulation system as in claim 11 wherein the first conveyor comprises the product path section and the second conveyor comprises the accumulator section.

13. The product conveying and accumulation system as in claim 12 wherein the transfer means is positioned at a given angle between the product path section and the accumulator section.

14. The product conveying and accumulation system as in claim 10 wherein the transfer means is positioned at a given angle between the product path section and the accumulator section.

15. A product conveying and accumulation system, said system comprising:

first conveying means for the movement of products from an upstream destination to a destination downstream of the system;

second conveying means for receiving products from the first conveying means, for accumulation and movement of products on or around the second conveying means and for movement and delivery of products to the downstream destination, said second conveying means comprising a single, continuous loop path conveyor consisting of a product path section moving in a forward direction of travel, said product path section located within a first transverse plane and an accumulator section located within a second transverse plane, in spaced apart relation with the product path section; and a single, planar transfer surface positioned between the product path section and the accumulator section, said transfer surface having two longitudinally extending edges, one edge directly adjacent to the product path section and the second edge directly adjacent to the accumulator section, whereby products moving along the product path section are caused to slide down from the product path section directly onto the transfer surface as a direct result of the movement of the product path section in said direction of travel and the relative positions of and interaction between the products as they move along the second conveying means, and not as a result of products encountering an intervening surface.

16. The product conveying and accumulation system as in claim 15 wherein the angle between the transfer surface and the product path section and the accumulator section is adjustable for changing the transverse plane within which the accumulator section is located.

17. The product conveying and accumulation system as in claim 15 wherein the transfer surface is positioned at a given angle between the product path section and the accumulator section.

18. The product conveying and accumulation system as in claim 15 wherein the transfer surface comprises a substantially frictionless outer surface which allows for smooth downward movement of products between the product path section and the accumulator section.

19. The product conveying and accumulation system as in claim 15 wherein the transfer surface comprises an outer surface which allows for smooth downward movement of products between the product path section and the accumulator section.

20. The product conveying and accumulation system as in claim 15 wherein the transfer surface comprises a transfer slide plate which allows for smooth downward movement of products between the product path section and the accumulator section.

21. The product conveying and accumulation system as in claim 15 wherein the transfer surface comprises an air slide system which allows for smooth downward movement of products between the product path section and the accumulator section.

22. The product conveying and accumulation system as in claim 15 wherein the transfer surface permits products to slide downwardly from the product path section to the accumulator section for recirculation to the downstream destination.

23. A product conveying and accumulation system, said system comprising:
    first conveying means for the movement of products from an upstream destination to a destination downstream of the system;
    second conveying means for receiving products from the first conveying means, for accumulation and movement of products on and around the second conveying means and for movement and delivery of products to the downstream destination, said second conveying means comprising first and second continuous loop path conveyors, the first conveyor comprising a product path section moving in a forward direction of travel, said product path surface located within a first transverse plane and the second conveyor comprising an accumulator section located within a second transverse plane, in spaced apart relation with the product path section; and
    a single, planar transfer surface positioned downward between the product path section and the accumulator section said transfer surface having two longitudinally extending edges, one edge directly adjacent to the product path section and the second edge directly adjacent to the accumulator section, whereby products moving along the product path section are caused to slide down from the product path section directly onto the transfer surface as a direct result of the movement of the product path section in said direction of travel and the relative positions of and interaction between the products as they move along the second conveying means, and not as a result of products encountering an intervening surface.

24. The product conveying and accumulation system as in claim 23 wherein the angle between the transfer surface and the product path section and the accumulator section is adjustable for changing the transverse plane within which the accumulator section is located.

25. The product conveying and accumulation system as in claim 23 wherein the transfer surface is positioned at a given angle between the product path section and the accumulator section.

26. The product conveying and accumulation system as in claim 23 wherein the transfer surface comprises a substantially frictionless outer surface which allows for smooth downward movement of products between the product path section and the accumulator section.

27. The product conveying and accumulation system as in claim 23 wherein the transfer surface comprises an outer surface which allows for smooth downward movement of products between the product path section and the accumulator section.

28. The product conveying and accumulation system as in claim 23 wherein the transfer surface comprises a transfer slide plate which allows for smooth downward movement of products between the product path section and the accumulator section.

29. The product conveying and accumulation system as in claim 23 wherein the transfer surface comprises an air slide system which allows for smooth downward movement of products between the product path section and the accumulator section.

30. The product conveying and accumulation system as in claim 23 wherein the transfer surface permits products to slide downwardly from the product path section to the accumulator section for recirculation to the downstream destination.

* * * * *